United States Patent
Elliott et al.

(10) Patent No.: US 8,938,224 B2
(45) Date of Patent: Jan. 20, 2015

(54) SYSTEM AND METHOD FOR AUTOMATICALLY ENABLING A CAR MODE IN A PERSONAL COMMUNICATION DEVICE

(75) Inventors: Doron M. Elliott, Detroit, MI (US); Thomas Lee Miller, Ann Arbor, MI (US); David Anthony Hatton, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/446,140

(22) Filed: Apr. 13, 2012

(65) Prior Publication Data

US 2012/0289215 A1 Nov. 15, 2012

Related U.S. Application Data

(60) Provisional application No. 61/485,468, filed on May 12, 2011.

(51) Int. Cl.
*H04M 3/00* (2006.01)
*B60R 25/24* (2013.01)

(52) U.S. Cl.
CPC ........... *B60R 25/24* (2013.01); *B60R 2325/205* (2013.01)
USPC ............ 455/418; 340/989; 340/905; 345/204

(58) Field of Classification Search
CPC ......... H04W 4/16; H04L 51/12; H04L 51/14; H04M 3/50; H04N 21/41422
USPC .................... 455/418; 340/989, 905; 345/204
See application file for complete search history.

(56) References Cited

U.S. PATENT DOCUMENTS

| | | | |
|---|---|---|---|
| 5,467,070 A | 11/1995 | Drori et al. | |
| 5,513,107 A | 4/1996 | Gormley | |
| 5,627,510 A | 5/1997 | Yuan | |
| 5,635,916 A | 6/1997 | Bucholtz et al. | |
| 5,828,319 A | 10/1998 | Tonkin et al. | |
| 6,018,291 A | 1/2000 | Marble et al. | |

(Continued)

FOREIGN PATENT DOCUMENTS

| | | |
|---|---|---|
| CN | 101596895 A | 12/2009 |
| DE | 102007046270 A1 | 4/2009 |
| WO | WO0125572 A1 | 4/2001 |

OTHER PUBLICATIONS

Autobiometrics, COM, US Distributor for ATRD Biometric Immobilizer, http://www.autobiometrics.com, Jul. 6, 2011.

(Continued)

*Primary Examiner* — Christopher M Brandt
*Assistant Examiner* — Joseph Dean, Jr.
(74) *Attorney, Agent, or Firm* — Jennifer M. Stec; Brooks Kushman P.C.

(57) ABSTRACT

In one embodiment, a system for transmitting information to a personal communication device (PCD) is provided. The system includes a communication module for being positioned in a vehicle. The communication module is configured to generate a vehicle status signal indicative of the vehicle being in a moving state and to generate a device name signal indicative of an identity of the communication module in the vehicle. The communication module is further configured to transmit the vehicle status signal and the device name signal to the PCD for limiting the operation of the PCD.

6 Claims, 3 Drawing Sheets

(56) References Cited

U.S. PATENT DOCUMENTS

| | | |
|---|---|---|
| 6,177,866 B1 | 1/2001 | O'Connell |
| 6,198,996 B1 | 3/2001 | Berstis |
| 6,263,282 B1 | 7/2001 | Vallancourt |
| 6,268,804 B1 | 7/2001 | Janky et al. |
| 6,271,745 B1 | 8/2001 | Anzai et al. |
| 6,434,455 B1 | 8/2002 | Snow et al. |
| 6,434,486 B1 | 8/2002 | Studt et al. |
| 6,438,491 B1 | 8/2002 | Farmer |
| 6,574,734 B1 | 6/2003 | Colson et al. |
| 6,590,495 B1 | 7/2003 | Behbehani |
| 6,679,702 B1 | 1/2004 | Rau |
| 6,690,956 B2 | 2/2004 | Chua et al. |
| 6,737,963 B2 | 5/2004 | Gutta et al. |
| 6,754,562 B2 | 6/2004 | Strege et al. |
| 6,810,309 B2 | 10/2004 | Sadler et al. |
| 6,853,919 B2 | 2/2005 | Kellum |
| 6,859,718 B2 | 2/2005 | Fritz et al. |
| 6,871,145 B2 | 3/2005 | Altan et al. |
| 6,906,619 B2 | 6/2005 | Williams et al. |
| 7,057,501 B1 | 6/2006 | Davis |
| 7,075,409 B2 | 7/2006 | Guba |
| 7,102,496 B1 | 9/2006 | Ernst, Jr. et al. |
| 7,124,027 B1 | 10/2006 | Ernst, Jr. et al. |
| 7,148,790 B2 | 12/2006 | Aoyama et al. |
| 7,207,041 B2 | 4/2007 | Elson et al. |
| 7,228,213 B2 | 6/2007 | Sakai et al. |
| 7,266,438 B2 | 9/2007 | Kellum et al. |
| 7,366,892 B2 | 4/2008 | Spaur et al. |
| 7,375,620 B2 | 5/2008 | Balbale et al. |
| 7,391,305 B2 | 6/2008 | Knoll et al. |
| 7,471,929 B2 | 12/2008 | Fujioka et al. |
| 7,602,782 B2 | 10/2009 | Doviak et al. |
| 7,812,712 B2 | 10/2010 | White et al. |
| 7,957,773 B2 | 6/2011 | Chua et al. |
| 8,131,205 B2 | 3/2012 | Rosen |
| 2002/0097145 A1 | 7/2002 | Tumey et al. |
| 2003/0079123 A1 | 4/2003 | Mas Ribes |
| 2003/0098892 A1* | 5/2003 | Hiipakka .................. 345/846 |
| 2004/0046452 A1 | 3/2004 | Suyama et al. |
| 2004/0227642 A1 | 11/2004 | Giles et al. |
| 2004/0236475 A1 | 11/2004 | Chowdhary |
| 2005/0134115 A1 | 6/2005 | Betts, Jr. et al. |
| 2005/0177635 A1 | 8/2005 | Schmidt et al. |
| 2005/0190039 A1 | 9/2005 | Aoyama |
| 2005/0193212 A1 | 9/2005 | Yuhara |
| 2005/0261816 A1 | 11/2005 | DiCroce et al. |
| 2006/0056663 A1 | 3/2006 | Call |
| 2006/0150197 A1 | 7/2006 | Werner |
| 2006/0156315 A1 | 7/2006 | Wood et al. |
| 2007/0050854 A1 | 3/2007 | Cooperstein et al. |
| 2007/0100514 A1 | 5/2007 | Park |
| 2007/0103339 A1 | 5/2007 | Maxwell et al. |
| 2007/0124043 A1 | 5/2007 | Ayoub et al. |
| 2008/0148374 A1 | 6/2008 | Spaur et al. |
| 2008/0275604 A1 | 11/2008 | Perry et al. |
| 2009/0195370 A1 | 8/2009 | Huffman et al. |
| 2010/0007479 A1 | 1/2010 | Smith |
| 2010/0035632 A1 | 2/2010 | Catten |
| 2010/0039224 A1 | 2/2010 | Okude et al. |
| 2010/0097178 A1 | 4/2010 | Pisz et al. |
| 2010/0148923 A1 | 6/2010 | Takizawa |
| 2011/0039581 A1 | 2/2011 | Cai et al. |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0077032 A1 | 3/2011 | Correale et al. |
| 2011/0105082 A1 | 5/2011 | Haley |
| 2011/0195699 A1* | 8/2011 | Tadayon et al. ............... 455/418 |
| 2011/0257973 A1 | 10/2011 | Chutorash et al. |
| 2011/0295444 A1 | 12/2011 | Westra et al. |
| 2012/0071140 A1* | 3/2012 | Oesterling et al. ......... 455/414.1 |

OTHER PUBLICATIONS

Sales@usasupremetech.com, In the U.S. a Car is Stolen Every 26 Seconds, The Wave of the Future, Biometrics Authentication, An Introduction.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

* cited by examiner

SYSTEM AND METHOD FOR AUTOMATICALLY ENABLING A CAR MODE IN A PERSONAL COMMUNICATION DEVICE

CROSS-REFERENCE TO RELATED APPLICATIONS

This application claims the benefit of U.S. provisional application Ser. No. 61/485,468 filed on May 12, 2011, which is hereby incorporated by reference in its entirety.

TECHNICAL FIELD

Embodiments set forth herein generally related to a system and method for automatically enabling a car mode in a personal communication device.

BACKGROUND

It is known to transmit information from a vehicle to a cell phone. One example of such an implementation is set forth in International Publication Number WO 2011/016886 ("the '886 publication") to Miller et al.

The '886 publication provides an apparatus for transmitting vehicle information to an occupant communication device (OCD). The apparatus comprises a communication module that is positioned within the vehicle. The communication module is configured to receive a transmission status signal indicative of a transmission mode for the vehicle. The communication module is further configured to transmit the transmission status signal over a wireless protocol to the OCD such that the OCD is disabled from being controlled by switches positioned thereon if the transmission mode enables movement of the vehicle.

SUMMARY

In one embodiment, a system for transmitting information to a personal communication device (PCD) is provided. The system includes a communication module for being positioned in a vehicle. The communication module is configured to generate a vehicle status signal indicative of the vehicle being in a moving state and to generate a device name signal indicative of an identity of the communication module in the vehicle. The communication module is further configured to transmit the vehicle status signal and the device name signal to the PCD for limiting the operation of the PCD.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
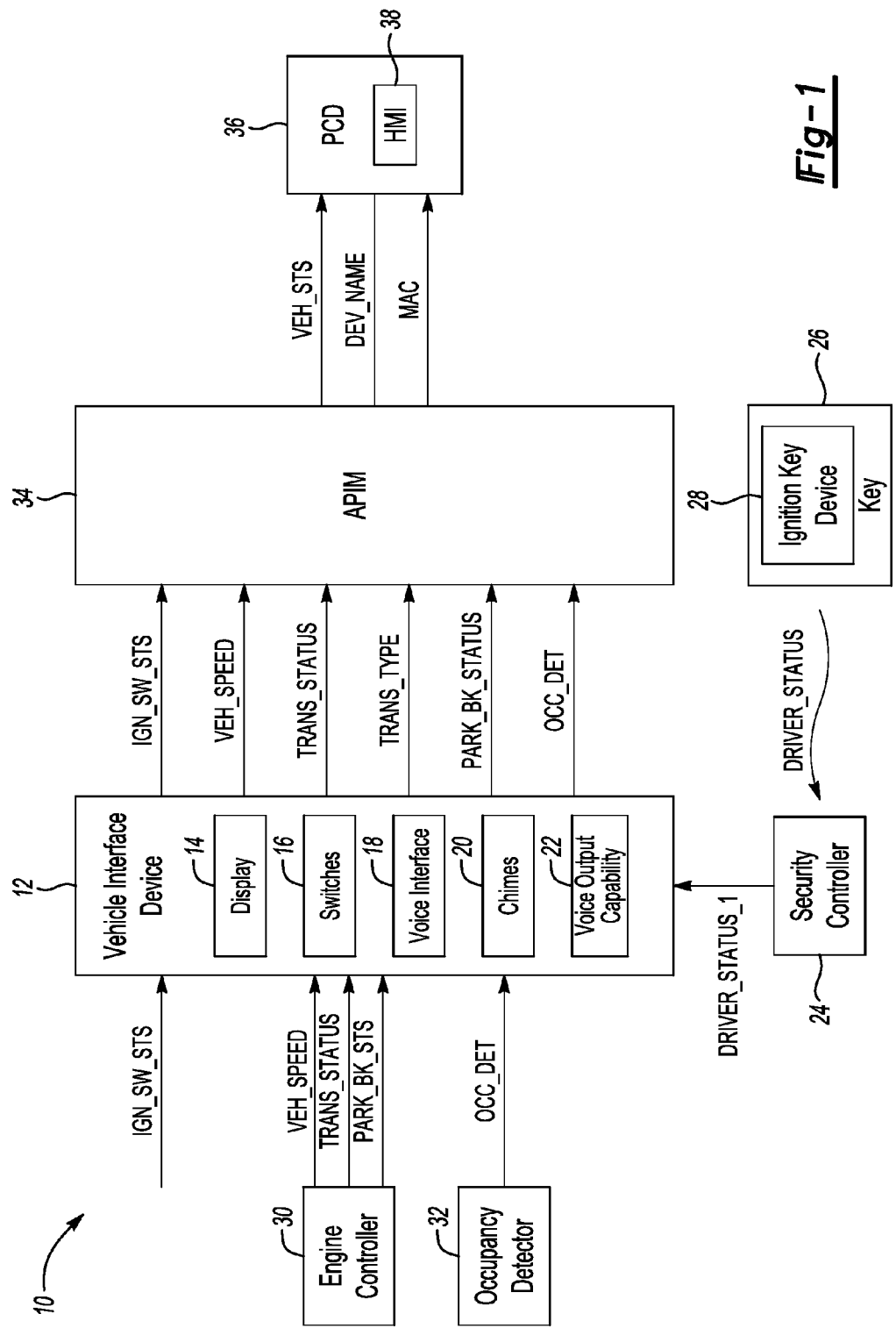
FIG. 1 depicts a system for automatically enabling a car mode in accordance to one embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Many cell phone providers offer a cell phone that utilize a human machine interface (HMI) which creates larger icons and faster shortcuts when a driver is in a vehicle. The larger icons allow drivers to easily select these items. The faster shortcuts may also allow commons tasks that are desired to be executed on the cell phone to be performed faster. The cell phone is defined to be in a "car mode" when it engages in an activity to enable easier use thereof when the driver is in the vehicle. One implementation may require that the driver manually launch an application to put the cell phone in the car mode prior to the driver entering into the vehicle. It may be possible to automatically launch the car mode by using a global positioning system (GPS) and/or tower to tower movement. While such methods which enable a cell phone to be placed in a car mode are effective, it may be desirable for the cell phone to automatically detect when it is in the presence of a vehicle by detecting signals therefrom and to place the cell phone into the car mode without intervention from the vehicle occupant. Further, it may be desirable to force the cell phone to enter into the car mode when a secondary driver such as a teenager, employee, valet, technician, etc. uses the vehicle to ensure ease of use for the cell phone when engaged in driving a vehicle that the secondary driver is not used to driving (or for newly licensed or younger drivers).

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform operation(s) disclosed herein.

Embodiments set forth herein generally provides for a system and/or method for automatically enabling a car mode in a personal communication device (PCD). The PCD may be a cell phone or other device that enables an occupant to communicate with another person via wireless signals that are transmitted therebetween. The disclosure as set forth herein depicts that various signals, such as but not limited to, vehicle speed, seatbelt status, transmission status, ignition status, number of occupants, and/or diagnostic information may be wirelessly transmitted to the PCD. In one example, a Bluetooth protocol may be used to enable the vehicle and the PCD to communicate with one another. Once communication is established with the vehicle, the PCD may enter into the car mode to enable ease of use.

FIG. 1 depicts a system 10 for automatically enabling a car mode in accordance to one embodiment of the present invention. The system 10 generally comprises a vehicle interface device ("device") 12. The device 12 includes a display 14 that provides information related to the various states of vehicle functionality or visual warnings to the driver. For example, the display 14 may provide, but not limited to, a driver identification message during vehicle startup, various administrative menu options, a seatbelt warning message, a speed limit start up message, vehicle near top speed message, top speed message, driver identification speed warnings, one or more levels of visual warnings for tailgating and/or an inhibit electronic stability control ("ESC") and forward collision warning (FCW) message, an alert to notify the driver that the vehicle is too close to another vehicle or object, etc.

The device 12 also includes a plurality of switches 16, a voice recognition command interface 18, chimes 20, and voice output capability 22. The driver may toggle the switches 16 to view different messages and/or select various options. The voice recognition command interface 18 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System", filed Dec. 31, 2003.

The chimes 20 may audibly notify the driver when predetermined vehicle conditions have been met. In one example, the device 12 may activate the chimes 28 when the vehicle is near a top speed, the vehicle has achieved a top speed, the vehicle has exceeded the top speed, there is a low level of fuel in the fuel tank, when the vehicle is detected to be too close to another vehicle or obstacle to prevent a collision, when the traction control is enabled, etc. In one example, the voice output capability 29 enables the device 12 to transmit audio signals to the driver in the manner, but not limited to, that described in the '440 publication. In one example, the switches 26 may be positioned within the display 24 such that the display 24 and the switches function as a touch screen. The switches 26 may be implemented as alpha-numeric characters. While the display 24, the switches 26, the voice input command interface 27, chimes 28, and the voice output capability 22 are shown within the device 12, it is contemplated that one or more of these mechanisms may be positioned exterior to the device 12.

A security controller 24 is operably coupled to the device 12. While FIG. 1 generally illustrates that the security controller 24 is positioned outside of the device 12, other implementations may include the security controller 24 being implemented directly within the device 12. In general, one or more of the signals transmitted to/from the device 12 may be transmitted via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys 26. The device 22 may receive a signal IGN_SW_STS from a body controller (not shown) to determine the position of the ignition switch. The keys 26 may be tagged or associated with a primary driver or a secondary driver of the vehicle. The primary driver may be a parent, employer, or other suitable person who exercises complete control over the vehicle. The secondary driver may be a teenager, a valet, an employee, a technician or other person who must abide by vehicle parameters established by the primary driver. The key 26 includes an ignition key device 28 embedded therein for wirelessly communicating with the vehicle. The ignition key device 28 comprises a transponder (not shown) having an integrated circuit and an antenna. The transponder is adapted to transmit an electronic code as a signal DRIVER_STATUS to a receiver (not shown) in the security controller 24. Data on the signal DRIVER_STATUS may be indicative of which driver (e.g., primary or secondary) is driving the vehicle. The signal DRIVER_STATUS may be in the form of radio frequency (RF) based signal or radio frequency identification (RFID) tag that corresponds to binary data. The security controller 24 determines if additional data in the signal DRIVER_STATUS matches predetermined data stored therein (e.g., in a look up table of the security controller 24) prior to allowing the vehicle to start for anti-theft purposes. A powertrain control module (or engine controller) 30 allows the vehicle to start the engine in the event the data on the signal DRIVER_STATUS matches the predetermined data.

The security controller 30 may transmit a signal DRIVER_STATUS_1 to indicate whether the particular driver is the primary driver or the secondary driver to various vehicle controllers or modules as either digital data on the data communication bus or hardwired signals. Prior to the security controller 30 transmitting the signal DRIVER_STATUS_1, the primary and secondary keys must be learned to the security controller 24. The learning and programming of the keys 26 as either a primary or a secondary key is set forth in U.S. Pat. No. 7,868,759 ("the '759 patent") to Miller et al., which is hereby incorporated by reference in its entirety. It is recognized that the security controller 24 may be a passive anti-theft controller as set forth in the '759 patent. It is also recognized that security controller 24 as set forth in FIG. 1 of the present disclosure may be implemented as a passive-entry-passive start (PEPS) controller as set forth in the '759 patent.

The engine controller 30 is operably coupled to the device 12. The device 22 transmits an authorization signal (not shown) to the engine controller 30 in response to determining that the key 26 is authorized to start the vehicle. The engine controller 30 is configured to provide a signal VEH_SPEED over the data communication bus to the device 12. The signal VEH_SPEED corresponds to the speed of the vehicle. The engine controller 30 is also configured to provide a signal TRANS_STATUS over the data communication bus to the device 12. The signal TRANS_STATUS corresponds to the transmission status of the vehicle (e.g., whether the vehicle is in Park, Neutral, Drive, Low). In addition, the engine controller 30 is configured to transmit a signal PARK_BK_STS over the data communication bus to the device 12. The signal PARK_BK_STS corresponds to the park brake status of the vehicle (e.g., whether the park brake switch is engaged). The signal PARK_BK_STS may be of interest in the event the vehicle is equipped with a manual transmission. For example, if the signal PARK_BK_STS indicates that the park brake is engaged, this condition may correspond to the vehicle being in a parked state while the vehicle is equipped with the manual transmission. It may not be possible for a manual transmission based vehicle to provide transmission status. If the signal PARK_BK_STS indicates that the park brake is not engaged, such a condition may indicate that the vehicle is moving.

An occupancy detector 32 may be operably coupled to the device 12. The occupancy detector 32 transmits a signal OCC_DET to the device 12. The signal OCC_DET is indicative of a person being positioned in a seat (e.g., driver and/or passenger) of the vehicle. The occupancy detector 32 may detect whether a seat belt if fastened or whether a driver is seated in the driver seat of the vehicle. In the event the occupancy detector 32 detects whether a driver is seated in the vehicle seat, a sensor may be positioned about one or more seats of the vehicle to detect the presence of the occupant in the seat(s).

An auxiliary protocol interface module (APIM) (or communication module) 34 may be operably coupled to the device 12 via the communication bus. The device 12 may transmit the signals IGN_SW_STS, VEH_SPEED, TRANS_STATUS, PARK_BK_STS, OCC_DET, and/or DRIVER_STATUS_1 to the APIM 34. The device 12 may also transmit a signal TRANS_TYPE which corresponds to the type of transmission that is equipped in the vehicle. For example, the vehicle may include an automatic transmission or a manual transmission. It is recognized that the signals noted above may be transmitted directly to the APIM 34 from the engine controller 14, the occupancy detector 32, and/or the security controller 24.

APIM 34 may be wirelessly coupled to any number of portable communication devices (PCDs) 36a-36n ("36") via a Bluetooth protocol or other suitable interface. Each PCD 18 may be a cell phone or other suitable alternative. The APIM 34 is part of an in-vehicle communication system (and includes at least one transmitter (not shown) and at least one receiver (not shown)) which interfaces with each PCD 36 to enable normal operation of the PCD 36, voice input control to perform a function with the PCD 36 so that the driver does not have to enter data directly into the PCD 36. The APIM 34 may allow the user to operate a PCD 36 either in a handheld mode (e.g., manual mode) or in a voice control mode (e.g., w/o touch input control). The APIM 34 may interface via switches (not shown) positioned within the vehicle to enable touch selection control to perform a function with the PCD 36 so that the driver does not have to enter data directly into the PCD 36. In one example, the APIM 34 may be implemented as part of the SYNC system developed by Ford Motor Company® and Microsoft®. Switches may be positioned on the controller 34, the vehicle's steering wheel (not shown) or on the device 12 to enable touch input.

The APIM 34 may include at least one transmitter (not shown) for transmitting a signal VEH_STS to the PCD 36. The signal VEH_STS may include data as indicated on the signals IGN_SW_STS, VEH_SPEED, TRANS_STATUS, TRANS_TYPE, PARK_BK_STATUS, OCC_DET, and/or DRIVER_STATUS_1 to the PCD 36 in the vehicle. Alternatively, the APIM 34 may transmit each signal (i.e., IGN_SW_STS, VEH_SPEED, TRANS_STATUS, TRANS_TYPE, PARK_BK_STATUS, OCC_DET, and/or DRIVER_STATUS_1) to the PCD 36.

The PCD 36 is configured to automatically enter into the car mode in the event any one or more of the signals IGN_SW_STS, VEH_SPEED, TRANS_STATUS, TRANS_TYPE, PARK_BK_STATUS and/or OCC_DET (or the signal VEH_STS) are received from the APIM 34. The PCD 36 includes an HMI 20 which is generally configured to provide icons or menus at a larger size to allow for ease of selection when the PCD 36 detects the presence of the vehicle. In addition, the PCD 36 may include any combination of hardware and software, which when executed, may process data faster while in the car mode. In addition, the PCD 36 may enter into the car mode when the signal DRIVER_STATUS_1 indicates that the driver of the vehicle is a secondary driver. If the driver of the vehicle is the primary driver, then the PCD 36 may not enter into the car mode. This condition of the PCD 36 entering into the car mode may occur irrespective of the status of the driver.

In another embodiment, the PCD 18 may also enter into the car mode if data on the signals IGN_SW_STS, VEH_SPEED, TRANS_STATUS, TRANS_TYPE, PARK_BK_STATUS and/or OCC_DET meet certain criteria. For example, the PCD 36 may enter into the car mode when (i) ignition switch is in RUN, (ii) vehicle speed exceeds a predetermined vehicle speed, (iii) transmission status in in a non-park state, (iv) park brake not engaged, and/or (v) vehicle occupant detected in vehicle seat. The PCD 18 may also disable usage thereof in the event one or more of the above conditions are met.

In another example, the PCD 18 may also enter into a hands free profile in which the PCD 18 can only be used via control inputs provided by the APIM 34. These may be in the form of voice control commands as received at the APIM 34 and then transmitted from the vehicle to the PCD 18. The HMI 20 may be completely disabled when the PCD 36 detects the vehicle. In another example, the HMI 20 may be disabled but for an emergency icon (e.g., 911 prompt) and/or allowed short cut icons (e.g., allowed/permitted contacts such a parent). The following function may not be available when the PCD 36 detects the vehicle: (a) texting, (b) data (e.g., e-mail and internet access), and (c) entertainment (e.g., games, movies, etc.).

The APIM 34 may also transmit a signal DEV_NAME which provides the identity of the device in the vehicle that is transmitting the signal to the PCD 36. For example, the signal DEV_NAME may correspond to transmitter that is known to be positioned in the vehicle (e.g., a SYNC transmitter in a Ford vehicle). In yet another example, the signal DEV_NAME may indicate the vehicle type and/or vehicle identification number (VIN). The APIM 34 may also transmit a signal MAC to the PCD 36. The signal MAC corresponds to a signal that includes a media access control (MAC) address. The MAC is part of a data communication protocol sub-layer that provides addressing and channel access control mechanisms which enable devices or network nodes to communicate with one another. The signal MAC as transmitted by the APIM 34 provides another unique identification of the device that is transmitting data to the PCD 36. When the PCD 36 is disconnected, the PCD 36 may exit from the car mode and return to its normal operating mode.

Figure 2:
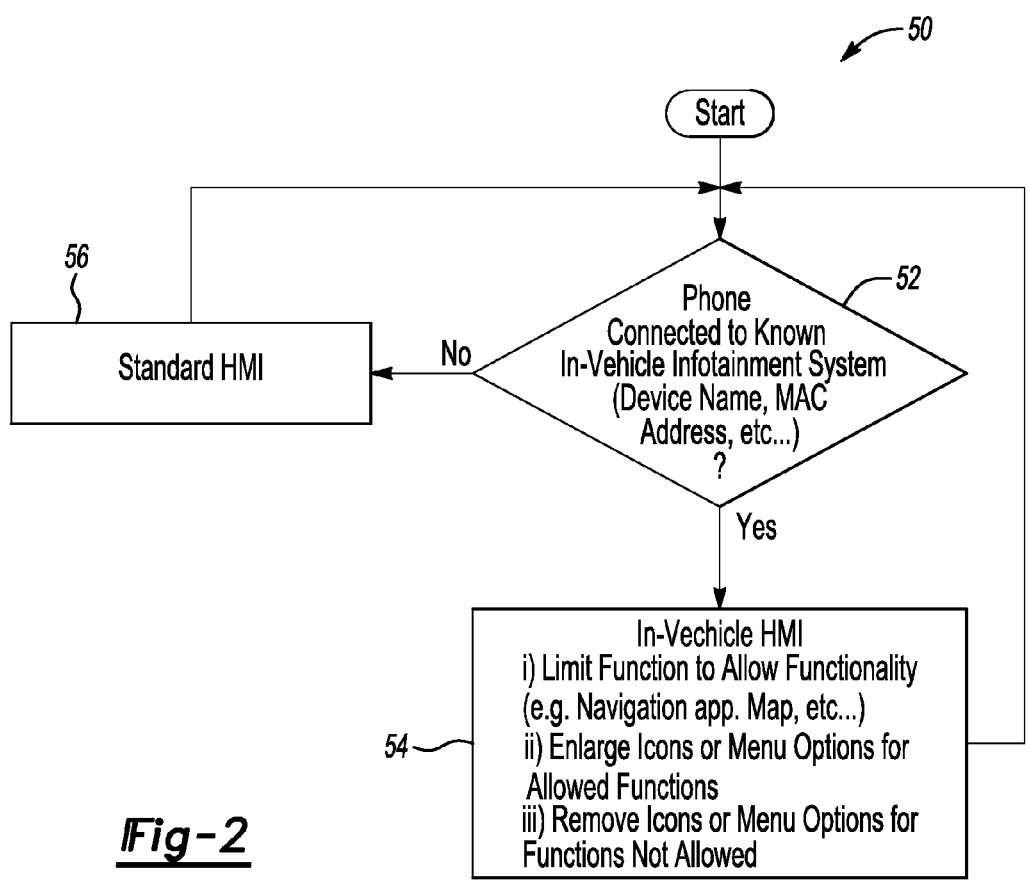
FIG. 2 depicts a method for a personal communication device (PCD) entering into the car mode in accordance to one embodiment of the present invention.

FIG. 2 depicts a method 50 for the PCD 36 to enter into the car mode in accordance to one embodiment of the present invention.

In operation 52, the PCD 36 determines whether it is operably coupled to the vehicle. For example, the PCD 36 monitors for signals that are transmitted from the APIM 34 to determine if it should be placed in the car mode.

The PCD 36 may monitor any one of the signals IGN_SW_STS, VEH_SPEED, TRANS_STATUS, TRANS_TYPE, PARK_BK_STATUS, OCC_DET, and/or DRIVER_STATUS_1 (or the signal VEH_STS), DEV_NAME, and/or MAC. In the event the PCD 36 receives any one of such signals, the method 50 moves to operation 54. If not, then the method 50 moves to operation 56.

In another implementation, the PCD 36 may monitor the data as received on any one or more of the signals noted above to determine if certain criteria has been met, such as for example the vehicle being in a moving state. For example, the PCD 36 may enter into the car mode when (i) the ignition switch is in RUN, (ii) vehicle speed exceeds a predetermined vehicle speed, (iii) transmission status in in a non-park state, (iv) park brake not engaged, and/or (v) vehicle occupant detected in vehicle seat. This condition may allow the PCD 36 to operate in a normal operating mode if none of the above conditions are met. If one or more of the above conditions are met, then the PCD 36 enters into the car mode. Further, in the event one or more conditions are met and the driver is a secondary driver, then the PCD 36 may enter into the car mode. If the driver is a primary driver and one or more of the above conditions are not met, then the PCD 36 may not enter into the car mode.

In operation 54, the PCD 36 enters into the car mode and the following operations may be performed by the PCD 36: (i) limited functionality allowed such as navigation applications, map, etc.; (ii) increased size of icons or menu options for allowed functions; and/or (iii) remove icons or menu options for functions not allowed.

As noted above, additional options may be performed by the PCD 36 in the event the vehicle is detected. For example, the PCD 18 may also enter into a hands free profile in which the PCD 18 can only be used via control inputs provided by the APIM 34. These may be in the form of voice control commands as received at the APIM 34 (via the vehicle interface device 12) and then transmitted from the vehicle to the PCD 18. The HMI 20 may be completely disabled when the PCD 36 detects the vehicle. In another example, the HMI 20 may be disabled but for an emergency icon (e.g., 911 prompt) and/or allowed short cut icons (e.g., allowed/permitted contacts such a parent). The following functions may not be available when the PCD 36 detects the vehicle: (a) texting, (b) data (e.g., e-mail and internet access), and (c) entertainment (e.g., games, movies, etc.).

In operation 56, the PCD 36 provides a standard display (or human interface device (HMI)) and is operating in a normal mode.

Figure 3:
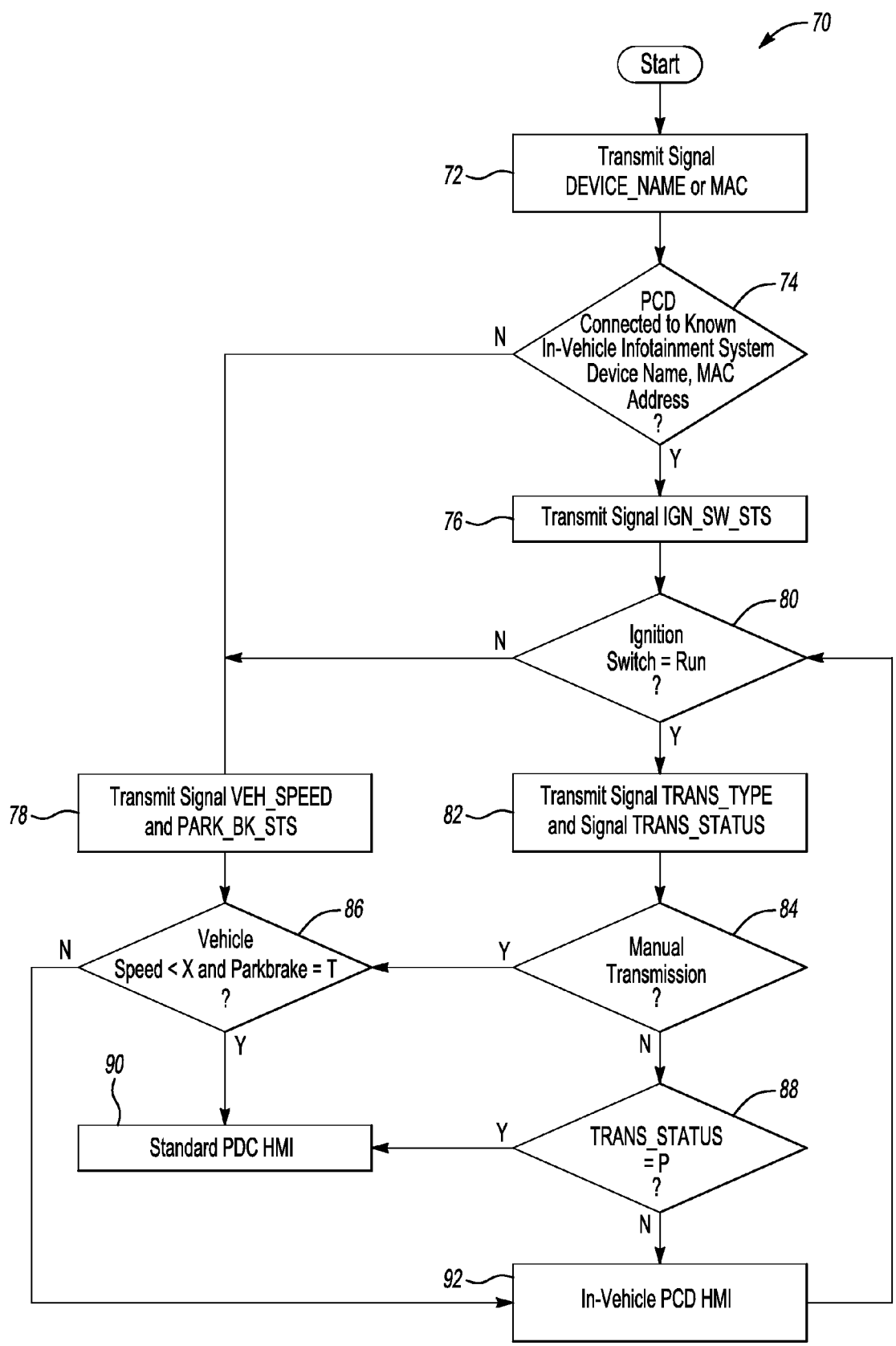
FIG. 3 depicts a method for transmitting information from a vehicle to the PCD in accordance to one embodiment of the present invention.

FIG. 3 depicts a method 70 for transmitting information from a vehicle to the personal communication device in accordance to one embodiment of the present invention.

In operation 72, the APIM 34 transmits the signal DEV_NAME or the signal MAC.

In operation 74, the PCD 36 determines whether it is electrically coupled to the APIM 34 (or to the vehicle) based on the information included on the signal DEV_NAME or MAC. If this condition is true (i.e., PCD 36 determines that the data on the DEV_NAME or the signal MAC corresponds to recognized data from the vehicle), then the method 70 moves to operation 76. If not, then the method 70 moves to operation 78.

In operation 76, the APIM 34 transmits the signal IGN_SW_STS.

In operation 80, the PCD 36 determines whether the signal IGN_SW_STS indicates that the ignition switch is in "RUN." If this condition is true, then the method 70 moves to operation 82. If not, then the method 70 moves to operation 78.

In operation 78, the APIM 34 transmits the signal VEH_SPEED and PARK_BK_STS.

In operation 82, the APIM 34 transmits the signal TRANS_TYPE and/or the signal TRANS_STATUS.

In operation 84, the PCD 36 determines whether data on the signal TRANS_TYPE corresponds to a manual transmission. If this condition is true, then the method 70 moves to operation 86. If not, then the method 70 moves to operation 88.

In operation 88, the PCD 36 determines whether the data on the signal TRANS_STATUS corresponds to the vehicle being in PARK. If this condition is true, then the method 70 moves to operation 90. If not, then the method 70 moves to operation 92.

In operation 86, the PCD 36 determines whether the vehicle speed is less than a predetermined threshold and whether the park brake status indicates that the park brake is engaged. If this condition is true, then the method 70 moves to operation 90. If not, then the method 70 moves to operation 92.

In operation 90, the PCD 36 provides a standard display (or human interface device (HMI)).

In operation 92, the PCD 36 enters into the car mode and the following operations may be performed by the PCD 36: (i) limited functionality allowed such as navigation applications, map, etc.; (ii) increased size of icons or menu options for allowed functions; and/or (iii) remove icons or menu options for functions not allowed. The PCD 36 may perform other options when in the car mode. These may include the PCD 18 entering into a hands free profile in which the PCD 18 can only be used via control inputs provided by the APIM 34. These may be in the form of voice control commands as received at the APIM 34 and then transmitted from the vehicle to the PCD 18. Also, the HMI 20 may be completely disabled when the PCD 36 detects the vehicle and PCD 36 usage may be disabled. In another example, the HMI 20 may be disabled but for an emergency icon (e.g., 911 prompt) and/or allowed short cut icons (e.g., allowed/permitted contacts such a parent). The following functions may not be available when the PCD 36 detects the vehicle: (a) texting, (b) data (e.g., e-mail and internet access), and (c) entertainment (e.g., games, movies, etc.).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for receiving information from a vehicle, the apparatus comprising:
 a personal communication device (PCD) being configured to receive a vehicle status signal and a device name signal from a communication module including a processor and memory to limit an operation thereof, the vehicle status signal being indicative of the vehicle being in a moving state and the device name signal being indicative of an identity of the communication module that is positioned in a vehicle, wherein the PCD is further configured to provide at least icon at a first size for at least one pre-selected function on a display thereof and to provide the at least one icon at a second size for the at least one pre-selected function on the display in response to the vehicle status signal and the device name signal, wherein the second size is greater than the first size.

2. The apparatus of claim 1, wherein PCD is configured to receive the vehicle status signal and the device name signal to simultaneously enable a navigation application and to disable touch entry operations.

3. The apparatus of claim 2, wherein the touch entry operations include texting and email.

4. The apparatus of claim 1, wherein the device name signal further comprises data indicative of at least one of a type of vehicle and vehicle identification number of the vehicle.

5. The apparatus of claim 1, wherein the PCD is configured to receive the vehicle status signal and the device name signal for selectively displaying one or more allowed icons thereof.

6. The apparatus of claim 1 wherein the PCD is a cellphone.

* * * * *